United States Patent
Rexavier et al.

(10) Patent No.: US 9,850,857 B2
(45) Date of Patent: Dec. 26, 2017

(54) TURBOCHARGER BLISK/SHAFT JOINT WITH HEAT ISOLATION

(71) Applicant: Electro-Motive Diesel, Inc., LaGrange, IL (US)

(72) Inventors: Raji Rexavier, Plainfield, IL (US); Gary Svihla, Burr Ridge, IL (US); Alan Wiedmeyer, Aurora, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 186 days.

(21) Appl. No.: 14/827,413

(22) Filed: Aug. 17, 2015

(65) Prior Publication Data

US 2017/0051706 A1    Feb. 23, 2017

(51) Int. Cl.
| | | |
|---|---|---|
| *F02D 23/00* | (2006.01) | |
| *F04D 29/30* | (2006.01) | |
| *F04B 17/00* | (2006.01) | |
| *F02M 26/04* | (2016.01) | |
| *F02B 37/00* | (2006.01) | |
| *F01D 5/02* | (2006.01) | |

(Continued)

(52) U.S. Cl.
CPC .............. *F02M 26/04* (2016.02); *F01D 5/025* (2013.01); *F01D 11/005* (2013.01); *F01D 25/16* (2013.01); *F01D 25/24* (2013.01); *F02B 37/00* (2013.01); *F05D 2220/40* (2013.01); *F05D 2230/232* (2013.01); *F05D 2230/60* (2013.01); *F05D 2240/24* (2013.01); *F05D 2240/60* (2013.01); *Y02T 10/144* (2013.01)

(58) Field of Classification Search
CPC ....... F02M 26/04; F01D 5/025; F01D 11/005; F01D 25/16; F01D 25/24; F02B 37/00; F02B 37/16; F02B 37/18; F05D 2220/40; F05D 2230/232; F05D 2230/60; F05D 2240/24; F05D 2240/60
USPC ........................ 60/602, 605.1; 417/406–407; 416/213 R; 228/165
See application file for complete search history.

(56) References Cited

U.S. PATENT DOCUMENTS

| | | | |
|---|---|---|---|
| 2,480,095 A | * | 8/1949 | Buchi ....................... F01D 5/04 417/406 |
| 4,235,484 A | | 11/1980 | Owen et al. |

(Continued)

FOREIGN PATENT DOCUMENTS

EP    2434126 A2    3/2012

*Primary Examiner* — Thai Ba Trieu
(74) *Attorney, Agent, or Firm* — Miller, Matthias & Hull

(57) ABSTRACT

This document discloses an exhaust gas turbocharger, which includes a turbine disk connected to a turbine disk hub. The turbine disk hub extends distally away from the turbine disk and towards a shaft that connects the turbine disk to a compressor. The shaft includes a proximal end that includes a shaft hub that extends proximally away from the shaft and towards the turbine disk hub. The turbine disk hub is coaxially connected to the shaft hub at a joint. The turbine disk hub and the shaft hub form a cavity between the turbine disk and the proximal end of the shaft. The turbocharger also includes a sleeve having an inner surface that surrounds and engages at least part of the turbine disk hub, at least part of the shaft hub and that further surrounds the joint and partially surrounds the cavity. The sleeve provides structural reinforcement for the joint and additional cooling functions beyond the cooling function provided by the cavity.

20 Claims, 2 Drawing Sheets

(51) Int. Cl.
    *F01D 11/00*     (2006.01)
    *F01D 25/16*     (2006.01)
    *F01D 25/24*     (2006.01)

(56) References Cited

U.S. PATENT DOCUMENTS

| | | | |
|---|---|---|---|
| 4,722,630 A * | 2/1988 | Fang | F01D 5/025 228/165 |
| 4,749,334 A * | 6/1988 | Byrne | F01D 5/025 416/244 A |
| 4,798,320 A * | 1/1989 | Fang | F01D 5/025 228/124.1 |
| 4,983,064 A | 1/1991 | Kawaguchi et al. | |
| 4,991,991 A | 2/1991 | Ito et al. | |
| 6,287,091 B1 | 9/2001 | Svihla et al. | |
| 6,302,647 B1 | 10/2001 | Schueler et al. | |
| 6,364,634 B1 | 4/2002 | Svihla et al. | |
| 6,739,845 B2 | 5/2004 | Woollenweber | |
| 6,848,180 B2 | 2/2005 | Shimizu | |
| 7,052,241 B2 | 5/2006 | Decker | |
| 7,241,416 B2 | 7/2007 | Sweetland | |
| 7,287,960 B2 | 10/2007 | Decker | |
| 8,241,006 B2 | 8/2012 | Renett | |
| 9,103,212 B2 * | 8/2015 | Le Brusq | F01D 5/025 |
| 2007/0059188 A1 | 3/2007 | Fraser et al. | |
| 2010/0154214 A1 | 6/2010 | Hsu et al. | |
| 2012/0121397 A1 | 5/2012 | Albuzat et al. | |
| 2014/0208741 A1 | 7/2014 | Svihla et al. | |

\* cited by examiner

TURBOCHARGER BLISK/SHAFT JOINT WITH HEAT ISOLATION

BACKGROUND

Technical Field

This document discloses a joint between a turbine disk and a shaft of a turbocharger that reduces heat transfer from the turbine disk to the shaft.

Description of the Related Art

Turbochargers increase the power density of an internal combustion engine by compressing the air entering the intake manifold of the engine. Turbochargers include a turbine and a compressor. The turbine may include a turbine inlet and outlet duct that surrounds a turbine disk. The turbine disk may be connected to a plurality of turbine blades or the disk and blades may be unitary in structure and referred to as a blisk. The compressor may include a compressor housing that surrounds a compressor disk. A common shaft may connect the compressor disk to the turbine disk. A flow of exhaust gas from the engine proceeds through an exhaust manifold to the turbine inlet duct, which imparts rotation to the turbine disk, the shaft and the compressor disk. As the compressor disk spins, fresh air is compressed and forced into the intake manifold of the engine thereby boosting the power density of the engine. The shaft connecting the turbine disk to the compressor disk typically passes through a journal bearing and a lubricating oil bath.

Heat from the exhaust gas creates high operating temperatures for turbocharger components, especially the turbine blades, which readily transfer heat to the turbine disk. The high operating temperature of the turbine disk needs to be attenuated before it is communicated to the lubricating oil bath and the journal bearing. One method to achieve this attenuation is to provide a pocket or cavity between the turbine disk and the shaft as disclosed in U.S. Pat. No. 7,241,416. However, this technique leads to reduced strength at the joint between the turbine disk and the shaft and it further undermines the capability of the turbine disk to withstand a severe loading event, such as a blade loss. Accordingly, there is a need for a turbine disk/shaft connection that reduces heat transfer from the turbine disk to the shaft, the journal bearing and the oil bath without compromising the structural integrity of the turbine disk/shaft connection.

SUMMARY OF THE DISCLOSURE

In one aspect, this document discloses an exhaust gas turbocharger, which may include a turbine disk connected to a connected turbine disk hub. The turbocharger may also include a shaft including a proximal end that includes a shaft hub. The turbine disk hub may be coaxially connected to the shaft hub at a joint. The turbine disk hub and the shaft hub may form a cavity between the turbine disk and the proximal end of the shaft. The turbocharger may further include a sleeve including an inner surface that surrounds and engages at least part of the turbine disk hub and at least part of the shaft hub. The sleeve may also surround the joint and at least partially surround the cavity.

In another aspect, this document discloses a method for connecting a turbine disk to a shaft. The method may include forming a turbine disk hub on a distal side of the turbine disk, wherein the turbine disk hub forms a turbine disk pocket. The method may further include forming a shaft hub on a proximal end of the shaft, wherein the shaft hub forms a shaft pocket. The method may further include connecting the turbine disk hub to the shaft hub to form a joint between the turbine disk hub and the shaft hub and a cavity that includes the turbine disk pocket and the shaft pocket. The method may further include placing a sleeve around the joint and around at least part of the cavity.

In another aspect, this document discloses a power system that may include an engine, an exhaust manifold fluidly connected to the engine and a turbocharger fluidly connected to the exhaust manifold. The turbocharger may include a turbine inlet duct configured to receive exhaust from the exhaust manifold. The turbine inlet duct may be fluidly connected to a turbine outlet duct. The turbocharger may also include a turbine disk disposed within the turbine inlet and outlet duct. The turbine disk may be connected to a turbine disk hub. The turbocharger may further include a shaft including a proximal end that includes a shaft hub. The turbine disk hub may be coaxially connected to the shaft hub at a joint. The turbine disk hub and the shaft hub may include a cavity between the turbine disk and the proximal end of the shaft. The turbocharger may further include a sleeve that includes an inner surface that surrounds and engages at least part of the turbine disk hub and at least part of the shaft hub. The sleeve may further surround the joint and at least partially surround the cavity.

The features, functions, and advantages discussed above may be achieved independently in various embodiments or may be combined in yet other embodiments, further details of which can be seen with reference to the following description and drawings.

BRIEF DESCRIPTION OF THE DRAWINGS

For a more complete understanding of the disclosed methods and apparatuses, reference should be made to the embodiments illustrated in greater detail in the accompanying drawings, wherein.

Figure 1:
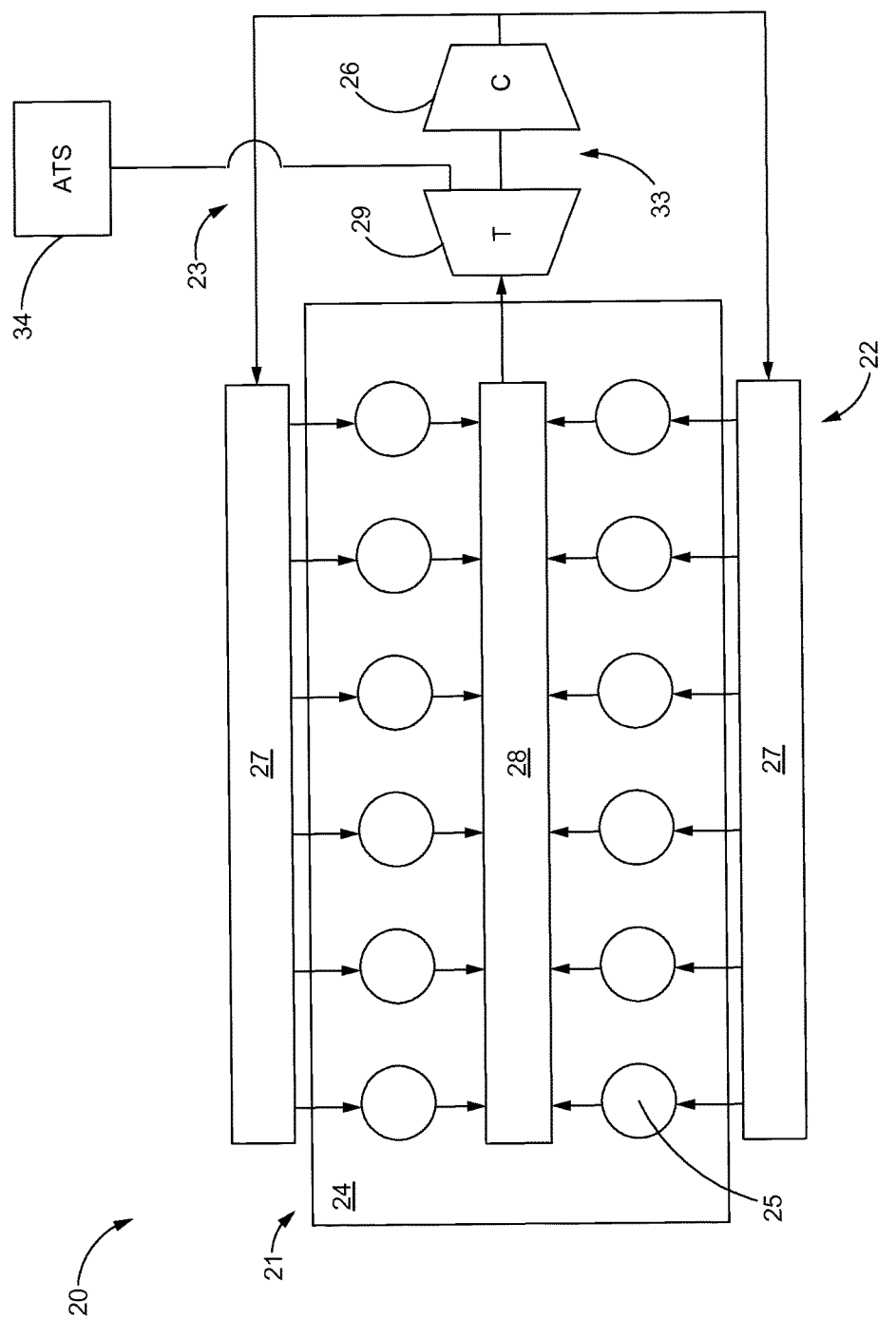
FIG. 1 is a schematic illustration of a power system.

The drawings are not to scale and illustrate the disclosed embodiments diagrammatically and in partial views. In certain instances, this disclosure may omit details which are not necessary for an understanding of the disclosed methods and apparatuses or which render other details difficult to perceive. Further, this disclosure is not limited to the particular embodiments illustrated herein.

DETAILED DESCRIPTION OF THE PRESENTLY PREFERRED EMBODIMENTS

With reference to the drawings, the term "distal" refers to parts or areas of a component that face or are disposed to the left in the drawings. See, e.g., the turbine disk distal wall 11 and the distal end 12 of the turbine disk hub 13 in FIG. 3. Conversely, the term "proximal" refers to parts or areas of a component that face or are disposed to the right in the drawings. See, e.g., the shaft proximal wall 14 and the proximal end 15 of the shaft hub 16 in FIG. 3.

FIG. 1 illustrates a power system 20 having a power source 21, an air induction system 22, and an exhaust system 23. For the purposes of this disclosure, the power source 21 may be a diesel engine, such as a two-stroke or a four-stroke diesel engine. One skilled in the art will recognize, however, that the power source 21 may be any other type of internal combustion engine such as, for example, a two or four-stroke gasoline or gaseous fuel-powered engine. The air induction system 22 may be configured to direct air or a mixture of air, fuel, and exhaust (such as in an EGR driven system) into the power source 21 for combustion. The exhaust system 23 directs combustion exhaust from the power source 21 to the atmosphere.

The power source 21 may include an engine block 24 that at least partially defines a plurality of cylinders 25. A piston (not shown) may be slidably disposed within each cylinder 25 to reciprocate between a top-dead-center position and a bottom-dead-center position, and a cylinder head (not shown) may be associated with each cylinder 25. Each cylinder 25, piston, and cylinder head may together at least partially define a combustion chamber. In the embodiment illustrated in FIG. 1, the power source 21 includes twelve cylinders 25 arranged in a V-configuration (i.e., a configuration having first and second banks or rows of cylinders 25). However, it is contemplated that the power source 21 may include a greater or lesser number of cylinders 25 and that the cylinders 25 may be arranged in an inline configuration, in an opposing-piston configuration, or in another configuration as will be apparent to those skilled in the art.

The air induction system 22 may include, among other things, at least one compressor 26 that may embody a fixed geometry compressor, a variable geometry compressor, or any other type of compressor configured to receive air and compress the air to a desired pressure level. The compressor 26 may direct air to one or more intake manifolds 27 associated with the power source 21. It should be noted that the air induction system 22 may include multiple compressors 26 arranged in a serial configuration, a parallel configuration, or a combination serial/parallel configuration, as will be apparent to those skilled in the art.

The exhaust system 23 may include, among other things, an exhaust manifold 28 connected to one or both of the banks of cylinders 25. The exhaust system 23 may also include at least one turbine 29 driven by the exhaust from the exhaust manifold 28 to rotate the compressor(s) 26 of the air induction system 22. The compressor 26 and the turbine 29 may together form a turbocharger 33. The turbine 29 may embody a fixed geometry turbine, a variable geometry turbine, or any other type of turbine configured to receive exhaust and convert energy in the exhaust to mechanical rotation. After exiting the turbine 29, the exhaust may discharge to the atmosphere through an aftertreatment system 34 that may include, for example, a hydrocarbon doser, a diesel oxidation catalyst (DOC), a diesel particulate filter (DPF), and/or another treatment device or system known in the art. It should be noted that the exhaust system 23 may include multiple turbines 29 arranged in a serial configuration, a parallel configuration, or a combination serial/parallel configuration, as will be apparent to those skilled in the art.

Figure 2:
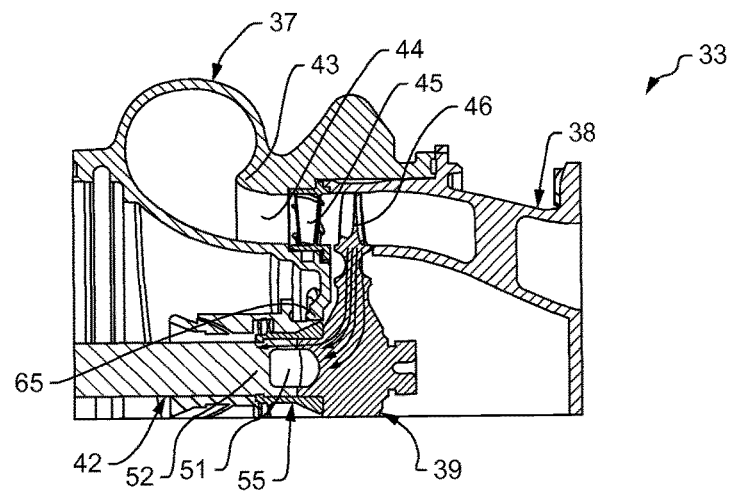
FIG. 2 is a partial cross-sectional view of a turbocharger that may be used in conjunction with the power system of FIG. 1.

As illustrated in FIG. 2, the turbocharger 33 may include a turbine inlet duct 37 and a turbine outlet duct 38 configured to house a turbine disk 39 that connects to a compressor disk (not shown) via a common shaft 42. The turbine inlet duct 37 may receive exhaust flow directly or indirectly from the exhaust manifold 28 before directing the exhaust flow past the tongue 43 and into the axial channel 44, which may include a nozzle ring 45 configured to accelerate the exhaust flow towards the turbine blades 46 that are connected to the turbine disk 39. The turbine disk 39 and turbine blades 46 may be unitary in structure, or in the form of a blisk, as will be apparent to those skilled in the art.

Figure 3:
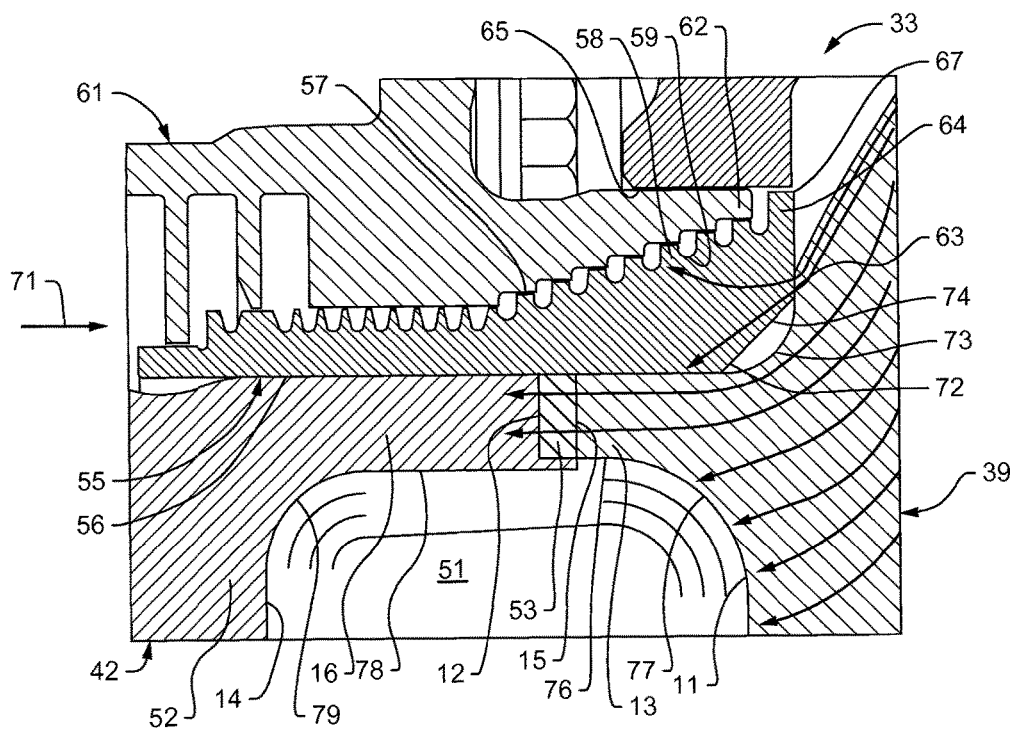
FIG. 3 is another partial cross-sectional view of the turbocharger shown in FIG. 2, particularly illustrating the joint between the turbine disk and the shaft, the cavity disposed between the turbine disk and the shaft, and the sleeve that surrounds the joint and partially surrounds the cavity.

As shown in FIG. 2 the turbine blades 46 engage the exhaust flowing through the axial channel 44 and the nozzle ring 45. Because the exhaust flow is at a relatively high temperature, the turbine blades 46 are subjected to relatively high temperatures. Further, heat from the turbine blades 46 is communicated to the turbine disk 49, regardless of whether the turbine blades 46 and the turbine disk 39 are unitary in structure (i.e., in the form of a blisk) or whether the turbine blades 46 are separate components that are connected to the turbine disk 39 (i.e., in the form of blades connected to a turbine wheel or disk). Further, heat from the turbine disk 39 could be readily communicated to the shaft 42, which is problematic because the shaft 42 passes through a lubricating oil bath and a journal bearing (not shown) before the shaft 42 connects to a compressor disk (not shown). To attenuate heat transfer from the turbine disk 39 to the shaft 42 or from the turbine blades 46, through the turbine disk 39 to the shaft 42, a cavity 51 is created between the turbine disk 39 and the proximal end 52 of the shaft 42 as illustrated in FIGS. 2-3. In short, because air is not an effective conductor of heat in comparison to solid metal, the cavity 51 effectively attenuates the transfer of heat between the turbine disk 39 and the shaft 42 by reducing the cross-sectional area of metal through which heat is conducted.

Referring to FIG. 3, the turbine disk 39 connects to a turbine disk hub 13 that extends distally away from the turbine disk 39. Conversely, the proximal end 52 of the shaft 42 connects to a shaft hub 16 that extends away from the proximal end 52 of the shaft 42 and toward the turbine disk hub 13. Because the rate of heat transfer from the turbine disk 39 to the shaft 42 is a function of the contact area between the turbine disk 39 and the shaft 42, the creation of the turbine disk hub 13 and the shaft hub 16 and connecting the turbine disk hub 13 to the shaft hub 16 at the joint 53 effectively reduces the contact area to the annular surfaces represented by the distal end 12 of the turbine disk hub 13 and the proximal end 15 of the shaft hub 16. However, reducing the contact area between the turbine disk 39 and the shaft 42 by forming the cavity 51 also reduces the strength of the joint 53. Therefore, to supplement the strength of the joint 53, the turbocharger 33 includes a sleeve 55. The sleeve 55 includes an inner surface 56 that surrounds at least part of the shaft hub 16 and at least part of the turbine disk hub 13 as shown in FIG. 3. The sleeve 55 also includes an outer surface 57, which includes a plurality of alternating ridges 58 and grooves 59.

The sleeve 55 is disposed within a turbine seal carrier 61. The turbine seal carrier 61 includes a proximal end 62. Further, the sleeve 55 also includes a proximal end 63. The proximal end 63 of the sleeve 55 connects to a proximal ridge 64. Further, referring to FIGS. 2 and 3, the turbine inlet duct 37 may include a radially inwardly extending engagement surface 65 that engages the proximal end 62 of the turbine seal carrier 61 and that encircles the proximal ridge 64 of the sleeve 55 with a radial gap 67 disposed between the proximal ridge 64 and the engagement surface 65 as shown in FIG. 3.

The turbocharger 33 employs compressed air generated by the compressor (not shown) to seal the lubricating oil within the turbocharger 33. Thus, incoming flow from the compressor (not shown) flows in the proximal direction, as indicated by the arrow 71 in FIG. 3. Once the incoming flow reaches the radial gap 67, part of the flow continues in the direction of the arrow 71 and part of the flow reverses course to envelope the sleeve 55. The compressed air generated by the compressor is at a substantially lower temperature than the exhaust flow that rotates the turbine blades 46 and turbine disk 39. Thus, compressed air flows into the grooves 59 disposed in the outer surface 57 of the sleeve 55 thereby cooling the sleeve 55 and maintaining the sleeve 55 at a lower temperature compared to the turbine disk 39. By providing the radial gap 67 between the proximal ridge 64 of the sleeve 55 and the engagement surface 65 of the turbine inlet duct 37, some compressed air flows through the radial gap 67 thereby blocking hot exhaust flow from entering the radial gap 67 and flowing distally around the outer surface 57 of the sleeve 55. Thus, a continuous flow of compressed air flows in the direction of the arrow 71 and envelopes the sleeve 55 which serves to isolate the sleeve 55 from the direct heat of the hot exhaust flow passing through the turbine. Thus, compressed air is used to isolate the sleeve 55 from the hot exhaust flow and maintain the sleeve 55 at a lower operating temperature.

Further, conductive heat transfer from the turbine disk 39 to the sleeve 55 is minimized by reducing the contact between the sleeve 55 and the turbine disk 39. The proximal end 63 of the sleeve 55 makes only a minimal contact with the turbine disk 39 as shown in FIG. 3. Also, the inner surface 56 of the sleeve 55 connects to the proximal end 63 of the sleeve 55 by way of an angled wall 72 that traverses an outer fillet 73 disposed between the turbine disk 39 and the turbine disk hub 13 thereby forming an annular air chamber 74 between the angled wall 72 and the outer fillet 73. In addition, the proximal end 63 of the sleeve 55 that engages the turbine disk 39 is positioned relatively close to the radial gap 67. Because the sleeve 55 rotates with the turbine disk 39 and the shaft 42, the cooler compressed air that envelopes the outer surface 57 of the sleeve 55 has a relatively high surface velocity thereby causing the sleeve 55 to pull heat away from the turbine disk 39, the turbine disk hub 13 and the shaft hub 16. The relatively high surface velocity of the compressed air also serves to reduce the amount of compressed air required to provide the cooling function for the sleeve 55. By removing heat from the turbine disk 39, the turbine disk hub 13 and the shaft hub 16, the sleeve 55 contributes to the reduced heat flow to the proximal end 52 of the shaft 42.

Finally, it will be noted that the cavity 51 is a combination of a pocket formed in the distal side of the turbine disk 39 by the turbine disk hub 13 and a pocket formed in the proximal end 52 of the shaft 42 by the shaft hub 16. More specifically, the turbine disk hub 13 includes a cylindrical wall 76 that extends from the distal end 12 of the turbine disk hub 13 to a turbine disk fillet 77. The turbine disk fillet 77 is disposed between the cylindrical wall 76 and the turbine disk distal wall 11. Similarly, the shaft hub 16 includes a shaft cylindrical wall 78 that extends from the proximal end 15 of the shaft hub 16 to a shaft fillet 79, which is disposed between the shaft cylindrical wall 78 and the shaft proximal wall 14. These two pockets are combined when the distal end 12 of the turbine disk hub 13 is joined to the proximal end 15 of the shaft hub 16 to form the joint 53. The joint 53 may be formed in a number of conventional ways, including, but not limited to, frictional welding.

INDUSTRIAL APPLICABILITY

This document discloses a turbocharger 33 that provides an attenuation of heat transfer from the turbine blades 46 and turbine disks 39 to the shaft 42 that connects the turbine disks 39 to a compressor disk (not shown). One design feature contributing to the heat attenuation is the formation of the cavity 51 between the turbine disk 39 and the shaft 42. The cavity 51 is formed by creating a shaft hub 16 that extends proximally towards the turbine disks 39 and a turbine disk hub 13 that extends distally towards the shaft 42. The proximal end 15 of the shaft hub 16 may be joined to the distal end 12 of the turbine disk hub 13 using a welding process, such as a frictional welding process to form a joint 53. Because the joint 53 is annular in configuration, a reinforcing sleeve 55 is placed around the joint 53 and at least partially around the turbine disk hub 13 and shaft hub 16. The sleeve 55 reinforces the joint 53. Further, in addition to heat transfer attenuation provided by the cavity 51, the sleeve 55 also provides heat attenuation. Specifically, because compressed air is used to seal lubricating oil within the turbocharger 33 and because this compressed air is at a lower temperature than the exhaust flow that drives the turbine disk 39, the compressed air generated by the compressor 26 is a convenient source of cooling air for the sleeve 55. The sleeve 55 includes an outer surface 57 with a plurality of alternating ridges 58 and grooves 59, which enable the cooling air from the compressor to envelope the sleeve 55. Further, a radial gap 67 is provided between the proximal ridge 64 of the sleeve 55 and the engagement surface 65 of the turbine inlet duct 37, which provides a small but continuous flow of cooling air through the radial gap 67. The flow of cooling air through the radial gap 67 prevents exhaust from entering the radial gap 67 and interfering with the cooling aspects provided by the flow of compressed air that envelopes the sleeve 55. The proximal end 63 of the sleeve 55 makes only minimal contact with the turbine disk 39 and an annular air chamber 74 is created between the angled wall 72 of the sleeve 55 and the outer fillet 73 of the turbine disk 39.

This document discloses a method for connecting a turbine disk 39 to a shaft 42. The method may include forming a turbine disk hub 13 on a distally facing side of the turbine disk 39. The method may further include forming a shaft hub 16 on a proximal end 52 of the shaft 42. The turbine disk hub 13 forms a turbine disk pocket and the shaft hub forms a shaft pocket. The method may further include connecting the turbine disk hub 13 to the shaft hub 16 to form a joint 53 between the turbine disk hub 13 and the shaft hub 16 and a cavity 51 that is a combination of the turbine disk pocket and the shaft pocket. The method may further include placing a sleeve 55 around the joint 53 and around at least part of the cavity 51. As noted above, the sleeve 55 provides reinforcement for the joint 53 and a cooling function separate and apart from the cooling function provided by the cavity 51.

While only certain embodiments of been set forth, alternative embodiments and various modifications will be apparent from the above description to those skilled in the art. These and other alternatives are considered equivalents and within the spirit and scope of the present disclosure.

What is claimed is:

1. A method for connecting a turbine disk to a shaft, the method comprising:
   forming a turbine disk hub on a distal side of the turbine disk, wherein the turbine disk hub forms a turbine disk pocket; forming a shaft hub on a proximal end of the shaft,
   wherein the shaft hub forms a shaft pocket; connecting the turbine disk hub to the shaft hub to form a joint between the turbine disk hub and the shaft hub and a cavity that includes the turbine disk pocket and the shaft pocket, wherein the turbine disk hub includes a turbine disk cylindrical wall that extends from the distal end of the turbine disk hub to a turbine disk fillet, the turbine disk fillet extending from the turbine disk cylindrical wall to a turbine disk distal wall, the turbine disk hub forming the turbine disk pocket defined by the turbine disk cylindrical wall, the turbine disk fillet and the turbine disk distal wall, and wherein the shaft hub includes a shaft cylindrical wall that extends from the proximal end of the shaft hub to a shaft fillet, the shaft fillet extending from the shaft cylindrical wall to a shaft proximal wall, the shaft hub forming the shaft pocket defined by the shaft cylindrical wall, the shaft fillet and the shaft proximal wall; and placing a sleeve around the joint and around at least part of the cavity, wherein the inner surface of the sleeve encircles the turbine disk cylindrical wall and the shaft cylindrical wall.

2. The method of claim 1 wherein the turbine disk hub includes a distal end and the shaft hub includes a proximal end and the connecting of the turbine disk hub to the shaft hub includes friction welding the distal end of the turbine disk hub to the proximal end of the shaft hub.

3. The method of claim 1 wherein the sleeve encircles at least part of the shaft fillet.

4. The method of claim 1 wherein the sleeve encircles at least part of the turbine disk fillet.

5. The method of claim 1 wherein the sleeve encircles at least part of the shaft fillet and at least part of the turbine disk fillet.

6. An exhaust gas turbocharger comprising:
a turbine disk connected to a turbine disk hub,
a shaft including a proximal end that includes a shaft hub,
wherein the turbine disk hub coaxially is connected to the shaft hub at a joint, the turbine disk hub and the shaft hub forming a cavity between the turbine disk and the proximal end of the shaft,
a sleeve including an inner surface that surrounds and engages at least part of the turbine disk hub and at least part of the shaft hub, the sleeve further surrounding the joint and at least partially surrounding the cavity, and
a turbine outlet duct that surrounds the turbine disk, the turbine outlet duct connected to a turbine inlet duct that surrounds a turbine seal carrier, the turbine inlet duct including an engagement surface,
wherein the turbine seal carrier includes a proximal end,
wherein the sleeve includes a proximal end that engages the turbine disk, the proximal end of the sleeve connected to a proximal ridge disposed between the proximal end of the turbine seal carrier and the turbine disk, and
wherein the engagement surface of the turbine inlet duct engages the proximal end of the turbine seal carrier and encircles the proximal ridge of the sleeve with a radial gap disposed between the proximal ridge of the sleeve and the engagement surface of the turbine inlet duct.

7. The turbocharger of claim 6 wherein the turbine disk hub and shaft hub are welded together to form the joint.

8. The turbocharger of claim 6 wherein the sleeve includes an outer surface, wherein the turbine seal carrier at least partially surrounds the outer surface of the sleeve.

9. The turbocharger of claim 8 wherein the outer surface of the sleeve includes a plurality of alternating ridges and grooves that encircle the sleeve, at least some of the ridges engaging the turbine seal carrier.

10. The turbocharger of claim 6 wherein the turbine disk hub includes a distal end and the shaft hub includes a proximal end joined to the distal end of the turbine disk hub to form the joint,
the turbine disk hub including a turbine disk cylindrical wall that extends from the distal end of the turbine disk hub to a turbine disk fillet, the turbine disk fillet extending from the turbine disk cylindrical wall to a turbine disk distal wall, the turbine disk hub forming a turbine disk pocket defined by the turbine disk cylindrical wall, the turbine disk fillet and the turbine disk distal wall,
the shaft hub including a shaft cylindrical wall that extends from the proximal end of the shaft hub to a shaft fillet, the shaft fillet extending from the shaft cylindrical wall to a shaft proximal wall, the shaft hub forming a shaft pocket defined by the shaft cylindrical wall, the shaft fillet and the shaft proximal wall,
the shaft pocket and the turbine disk pocket forming the cavity, and
the inner surface of the sleeve encircling the turbine disk cylindrical wall and the shaft cylindrical wall.

11. The turbocharger of claim 10 wherein the sleeve encircles at least part of the shaft fillet.

12. The turbocharger of claim 10 wherein the sleeve encircles at least part of the turbine disk fillet.

13. The turbocharger of claim 10 wherein the sleeve encircles at least part of the shaft fillet and at least part of the turbine disk fillet.

14. The turbocharger of claim 6 wherein the turbine disk hub is connected to the turbine disk by an outer fillet, and
the inner surface of the sleeve is connected to the proximal end of the sleeve by an angled wall that forms an annular air chamber with the outer fillet.

15. The turbocharger of claim 6 wherein the turbine disk is a blisk.

16. The turbocharger of claim 6 wherein the turbine disk is connected to a plurality of radially outwardly extending turbine blades.

17. An exhaust gas turbocharger comprising:
a turbine disk connected to a turbine disk hub,
a shaft including a proximal end that includes a shaft hub,
wherein the turbine disk hub coaxially is connected to the shaft hub at a joint, the turbine disk hub and the shaft hub forming a cavity between the turbine disk and the proximal end of the shaft,
wherein the turbine disk hub includes a distal end and the shaft hub includes a proximal end joined to the distal end of the turbine disk hub to form the joint,
wherein the turbine disk hub further includes a turbine disk cylindrical wall that extends from the distal end of the turbine disk hub to a turbine disk fillet,
wherein the turbine disk fillet extends from the turbine disk cylindrical wall to a turbine disk distal wall, and the turbine disk hub forms a turbine disk pocket defined by the turbine disk cylindrical wall, the turbine disk fillet and the turbine disk distal wall, wherein the shaft hub includes a shaft cylindrical wall that extends from the proximal end of the shaft hub to a shaft fillet, the shaft fillet extending from the shaft cylindrical wall to a shaft proximal wall, the shaft hub forming a shaft pocket defined by the shaft cylindrical wall, the shaft fillet and the shaft proximal wall, wherein the shaft pocket and the turbine disk pocket forms the cavity, and a sleeve including an inner surface that surrounds and engages at least part of the turbine disk hub and at least part of the shaft hub, wherein the sleeve further surrounds the joint and at least partially surrounding the cavity, and wherein the inner surface of the sleeve encircles the turbine disk cylindrical wall and the shaft cylindrical wall.

18. The turbocharger of claim 17 wherein the sleeve encircles at least part of the shaft fillet.

19. The turbocharger of claim 17 wherein the sleeve encircles at least part of the turbine disk fillet.

20. The turbocharger of claim 17 wherein the sleeve encircles at least part of the shaft fillet and at least part of the turbine disk fillet.

* * * * *